United States Patent
Kato et al.

(10) Patent No.: US 9,464,629 B2
(45) Date of Patent: Oct. 11, 2016

(54) SERVO REGULATOR

(71) Applicant: KAYABA INDUSTRY CO., LTD., Minato-ku, Tokyo (JP)

(72) Inventors: Hiroki Kato, Machida (JP); Susumu Narita, Sagamihara (JP); Tetsuya Iwanaji, Sagamihara (JP); Takeru Hosokawa, Sagamihara (JP)

(73) Assignee: KYB Corporation, Tokyo (JP)

( * ) Notice: Subject to any disclaimer, the term of this patent is extended or adjusted under 35 U.S.C. 154(b) by 399 days.

(21) Appl. No.: 14/349,731

(22) PCT Filed: Jan. 21, 2013

(86) PCT No.: PCT/JP2013/051061
§ 371 (c)(1),
(2) Date: Apr. 4, 2014

(87) PCT Pub. No.: WO2013/145819
PCT Pub. Date: Oct. 3, 2013

(65) Prior Publication Data
US 2014/0286798 A1    Sep. 25, 2014

(30) Foreign Application Priority Data
Mar. 29, 2012 (JP) ................ 2012-076967

(51) Int. Cl.
F04B 1/26 (2006.01)
F04B 27/18 (2006.01)
F16K 31/06 (2006.01)

(52) U.S. Cl.
CPC ............. *F04B 27/1804* (2013.01); *F04B 1/26* (2013.01); *F16K 31/06* (2013.01); *F04B 2027/1822* (2013.01)

(58) Field of Classification Search
CPC .................. F04B 1/26; F16K 31/06
USPC ............................................... 92/13
See application file for complete search history.

(56) References Cited

U.S. PATENT DOCUMENTS

| 4,756,157 A * | 7/1988 | Appel | F16H 61/438 60/444 |
| 7,131,630 B2 * | 11/2006 | Adler | F04B 1/26 251/129.01 |
| 2005/0252369 A1 | 11/2005 | Lilla | |

FOREIGN PATENT DOCUMENTS

| JP | 97580/1981 U | 8/1981 |
| JP | 6-185663 A | 7/1994 |

(Continued)

OTHER PUBLICATIONS

International Search Report mailed Apr. 23, 2013, in corresponding International Application No. PCT/JP2013/051061.

(Continued)

*Primary Examiner* — Thomas E Lazo
(74) *Attorney, Agent, or Firm* — Hauptman Ham, LLP

(57) ABSTRACT

A servo regulator that causes a servo piston to move on the basis of working fluid pressure in two pressure chambers includes: a sleeve that is inserted into an insertion hole formed in a case and has a supply port capable of supplying a working fluid from a fluid pressure source to one of the pressure chambers; a spool valve disposed in the sleeve so as to be biased by a biasing member; and a solenoid that is attached to the case in order to drive the spool valve via a plunger. The sleeve includes a pressure receiving portion on which a fluid pressure of the working fluid from the fluid pressure source is exerted, and is pressed against an end surface of the solenoid by a biasing force acting on the pressure receiving portion.

3 Claims, 7 Drawing Sheets

(56) References Cited

FOREIGN PATENT DOCUMENTS

| JP | 2009-243425 A | | 10/2009 |
|---|---|---|---|
| JP | 2009243425 A | * | 10/2009 |

OTHER PUBLICATIONS

Office Action mailed Jun. 2, 2015, corresponding to Chinese patent application No. 201380001398.4.

* cited by examiner

US 9,464,629 B2

SERVO REGULATOR

RELATED APPLICATIONS

The present application is a National Phase of International Application Number PCT/JP2013/051061, filed Jan. 21, 2013, which claims priority to Japanese Application Number 2012-076967, filed Mar. 29, 2012.

TECHNICAL FIELD

The present invention relates to a servo regulator that moves a servo piston using a working fluid.

BACKGROUND ART

In a variable capacity piston pump installed in a vehicle such as a construction machine, a discharge flow of the piston pump is regulated by moving a servo piston of a servo regulator in order to vary a tilt angle of a swash plate of the piston pump.

JP2009-243425A discloses a servo regulator that controls an operation of a servo piston by driving a spool valve using a solenoid to regulate an oil pressure in pressure chambers facing respective ends of the servo piston.

SUMMARY OF INVENTION

In this type of servo regulator, the spool valve is provided to slide along a cylindrical sleeve that is inserted into an insertion hole formed in a case. The sleeve is disposed in the insertion hole such that an outer edge part of a sleeve end surface is pressed against a contact portion formed on an inner peripheral surface of the insertion hole (see FIG. 7).

In the servo regulator, a gap (an initial gap) between the end surface of the spool valve in an initial position and a tip end of a plunger of the solenoid in a non-driven condition is preferably kept constant. However, the initial gap varies to a certain extent due to dimension errors and the like in various constituent members. With a configuration in which the sleeve is pressed against the contact portion of the insertion hole, variation in the initial gap is particularly large due not only to a dimension error in the sleeve, but also an error in a formation position of the contact portion and so on. When the initial gap varies greatly in this manner, controllability of the spool valve deteriorates.

An object of the present invention is to provide a servo regulator with which variation in a gap between an end surface of a spool valve in an initial position and a tip end of a plunger of a solenoid in a non-driven condition can be reduced.

According to an aspect of the present invention, a servo regulator including a servo piston disposed in a case to be free to slide, and pressure chambers provided to face respective ends of the servo piston, wherein the servo piston is moved in an axial direction by controlling a working fluid pressure in the pressure chambers, is provided. The servo regulator includes: a sleeve that is inserted into an insertion hole formed in the case and has a port capable of supplying a working fluid from a fluid pressure source to one of the pressure chambers; a spool valve disposed in the sleeve and biased by a biasing member to be capable of opening and closing the port; and a solenoid that is attached to the case so as to close the insertion hole, and drives the spool valve against a biasing force of the biasing member via a plunger. The sleeve includes a pressure receiving portion on which a fluid pressure of the working fluid from the fluid pressure source is exerted, and is pressed against an end surface of the solenoid by a biasing force acting on the pressure receiving portion.

Embodiments and advantages of the present invention will be described in detail below with reference to the attached figures.

DESCRIPTION OF EMBODIMENTS

Figure 1:
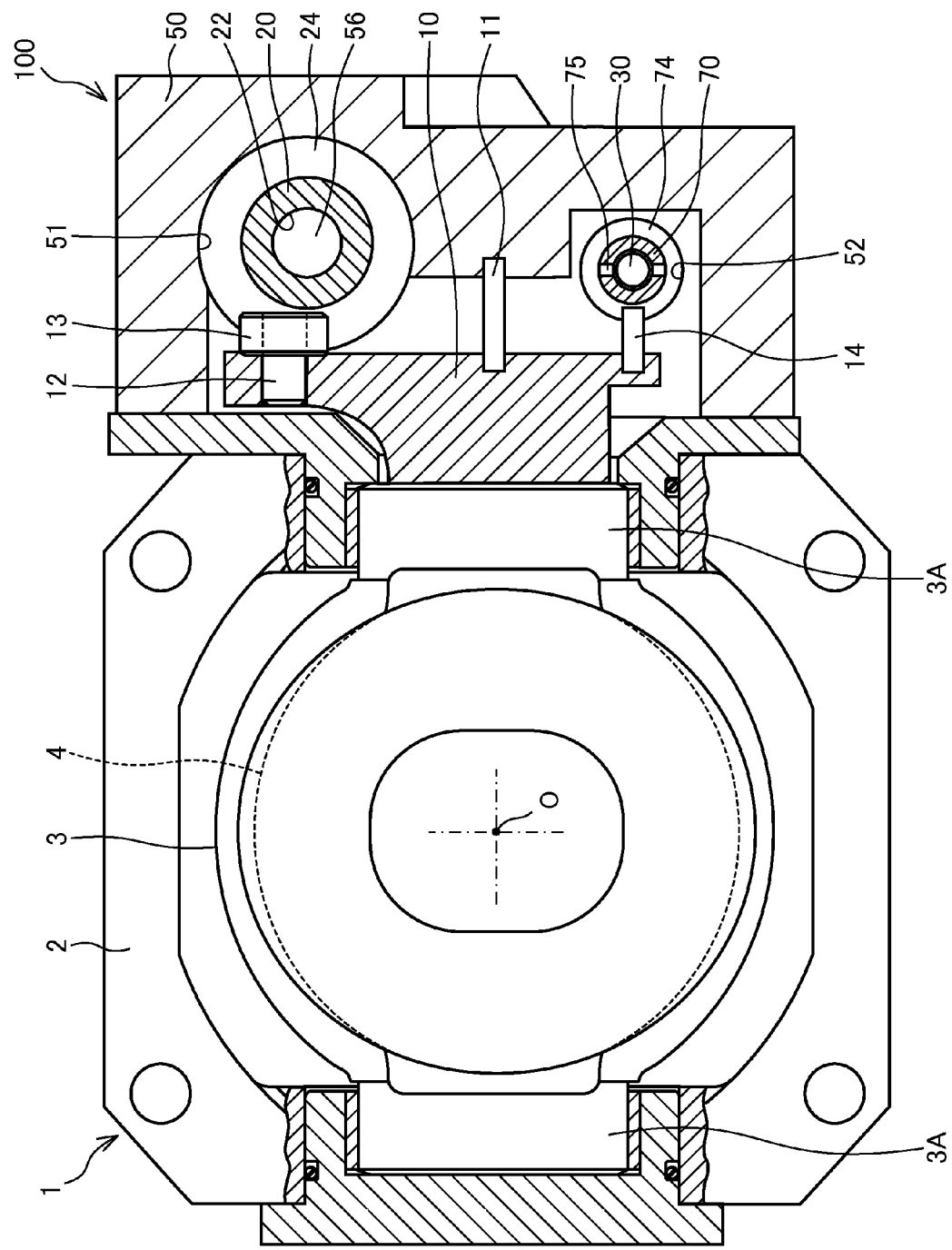
FIG. 1 is a partial sectional view of a variable capacity piston pump including a servo regulator according to an embodiment of the present invention.

Referring to FIG. 1, a piston pump 1 including a servo regulator 100 according to an embodiment of the present invention will be described. FIG. 1 shows the piston pump 1 from a I-I plane in FIG. 2.

The piston pump 1 is a variable capacity piston pump used in a hydrostatic continuously variable transmission (HST) that supplies working oil (working fluid) to a travel hydraulic motor of a vehicle such as a construction machine.

The piston pump 1 includes a swash plate 3 provided rotatably in a housing 2 via a pair of trunnion shafts 3A, and a cylinder block 4 that rotates relative to the swash plate 3 on the basis of power from an engine of the vehicle.

The cylinder block 4 is a columnar member. A plurality of cylinders are formed in the cylinder block 4 in series in a circumferential direction. The cylinders extend in an axial direction, and a piston is housed inside each cylinder to be capable of sliding. One end of the piston contacts the swash plate 3, and the piston is configured to perform a single reciprocation inside the cylinder every time the cylinder block 4 completes a single revolution.

A volume chamber is defined within each cylinder of the cylinder block 4 by the piston. The volume chamber is connected alternately to an intake port and a discharge port as the cylinder block 4 rotates. During an intake stroke in which the piston moves through the cylinder such that the volume chamber expands, working oil is suctioned into the volume chamber through the intake port. During a discharge stroke in which the piston moves through the cylinder such that the volume chamber contracts, the working oil is discharged from the volume chamber to the discharge port.

In the piston pump 1, a stroke of the piston can be modified by varying a tilt angle (a rotation angle) of the swash plate 3 relative to a rotary axis O of the cylinder block 4. In so doing, a flow rate of the working oil discharged from the piston pump 1 can be varied.

When the tilt angle of the swash plate 3 is 0°, or in other words when the swash plate 3 is in a neutral position, a discharge flow of the piston pump 1 is zero, and therefore the travel hydraulic motor stops rotating.

The piston pump 1 is a bidirectional discharge pump. By switching a tilt direction of the swash plate 3 of the piston pump 1 about the tilt angle of 0°, the port through which the working oil is either suctioned or discharged is switched. By switching a working oil discharge direction of the piston pump 1, a rotation direction of the travel hydraulic motor can be modified, and as a result, the vehicle can be switched between forward and reverse travel.

Next, referring to FIGS. 1 to 3, the servo regulator 100 that controls the tilt angle of the swash plate 3 of the piston pump 1 will be described.

Figure 2:
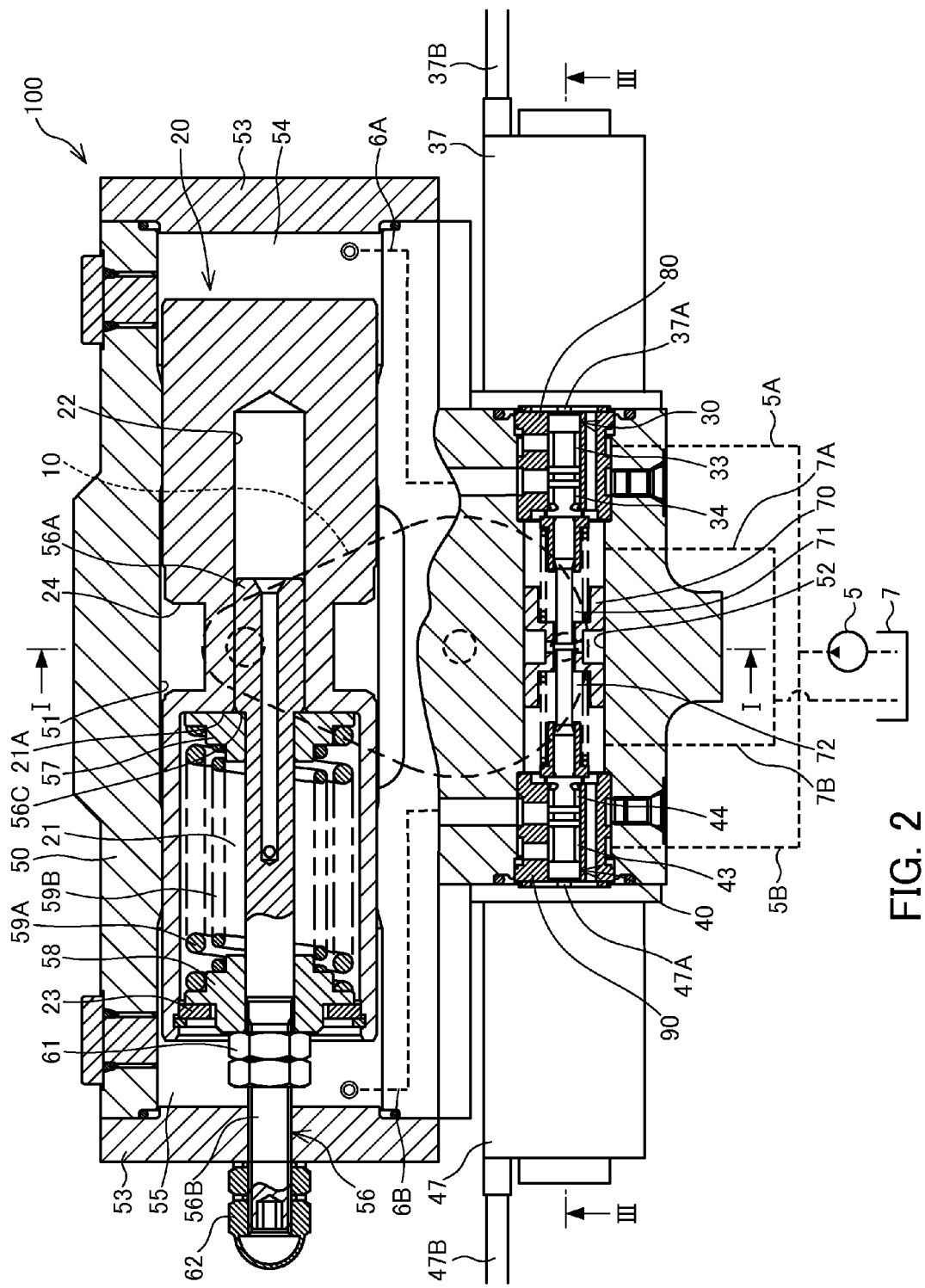
FIG. 2 is a partial sectional view of the servo regulator.

As shown in FIGS. 1 and 2, the servo regulator 100 includes a servo piston 20 coupled to the swash plate 3 of the piston pump 1 via an arm 10, first and second spool valves 30, 40 that regulate a working oil pressure acting on the servo piston 20, and first and second solenoids 37, 47 that drive the first and second spool valves 30, 40.

The various constituent members of the servo regulator 100 are housed in a case 50 fixed to the housing 2 of the piston pump 1. Two insertion holes 51, 52 are formed substantially parallel to each other in the case 50. The servo piston 20 is inserted into the insertion hole 51, while the first spool valve 30 and the second spool valve 40 are inserted into the insertion hole 52.

Respective open ends of the insertion hole 51 are closed by covers 53, 53. A first pressure chamber 54 is defined within the insertion hole 51 by one of the covers 53 and one end of the servo piston 20, and a second pressure chamber 55 is defined within the insertion hole 51 by the other cover 53 and the other end of the servo piston 20.

The servo piston 20 is a columnar member disposed in the insertion hole 51 to be free to slide. The servo piston 20 moves through the insertion hole 51 in an axial direction on the basis of working oil pressure in the first pressure chamber 54 and the second pressure chamber 55. The servo piston 20 is guided by a guide rod 56 fixed to the cover 53. A housing recess 21 capable of housing a first retainer 57 and a second retainer 58 that are attached to an outer periphery of the guide rod 56 is formed in a rod side end portion of the servo piston 20. Further, a guide hole 22 that extends in the axial direction from a bottom portion 21A of the housing recess 21 is formed in the servo piston 20.

The guide rod 56 and the servo piston 20 are disposed coaxially. A tip end portion 56A of the guide rod 56 has a larger diameter than a shaft portion 56B, and is inserted into the guide hole 22 in the servo piston 20 to be free to slide.

The first retainer 57 and the second retainer 58 are attached to the shaft portion 56B of the guide rod 56 to be free to slide. Springs 59A, 59B are provided in a compressed condition between the first retainer 57 and the second retainer 58. The springs 59A, 59B bias the servo piston 20 to a neutral position.

As shown in FIG. 2, when the servo piston 20 is in the neutral position, the first retainer 57 contacts the bottom portion 21A of the housing recess 21 and a step portion 56C formed on a boundary between the tip end portion 56A and shaft portion 56B of the guide rod 56. The second retainer 58 contacts a stopper ring 23 fixed to an open end of the housing recess 21 and a nut 61 screwed to the shaft portion 56B.

When the servo piston 20 moves in a leftward direction from the neutral position shown in FIG. 2, the first retainer 57 moves along the shaft portion 56B of the guide rod 56 so as to separate from the step portion 56C. As a result, the springs 59A, 59B between the first retainer 57 and the second retainer 58 are compressed, leading to an increase in a spring reaction force attempting to return the servo piston 20 to the neutral position. When the servo piston 20 moves in a rightward direction from the neutral position shown in FIG. 2, on the other hand, the second retainer 58 moves along the shaft portion 56B of the guide rod 56 so as to separate from the nut 61. As a result, the springs 59A, 59B between the first retainer 57 and the second retainer 58 are compressed, leading to an increase in the spring reaction force attempting to return the servo piston 20 to the neutral position.

It should be noted that slight adjustments can be made to the neutral position of the servo piston 20 by adjusting a position in which the guide rod 56 is fastened to the cover 53 and then fixing the guide rod 56 to the cover 53 via a nut 62.

An annular groove 24 is formed in an outer periphery of the servo piston 20 in a central position in the axial direction. A tip end of the arm 10 is coupled to the annular groove 24. The arm 10 is a member for transmitting displacement of the servo piston 20 to the swash plate 3 of the piston pump 1.

As shown in FIG. 1, the arm 10 is supported to be free to rotate on a rotary shaft 11 disposed in the case 50. The arm 10 is coupled to the trunnion shafts 3A of the swash plate 3 such that a rotary center of the arm 10 and a rotary center of the swash plate 3 are aligned.

A pin 12 is provided on one end of the arm 10, and a slide metal 13 is disposed on the pin 12 to be free to rotate. The slide metal 13 of the arm 10 is inserted into the annular groove 24 of the servo piston 20. A pin 14 is provided on another end of the arm 10, and the pin 14 is inserted into an annular groove 74 (see FIG. 3) of a spring holder 70 to be described below.

As described above, the servo piston 20 and the swash plate 3 are coupled via the arm 10. When the servo piston 20 moves, the slide metal 13 moves together with the servo piston 20, causing the arm 10 to rotate about the rotary shaft 11, and as a result, the swash plate 3 is rotated by the rotation of the arm 10.

Figure 3:
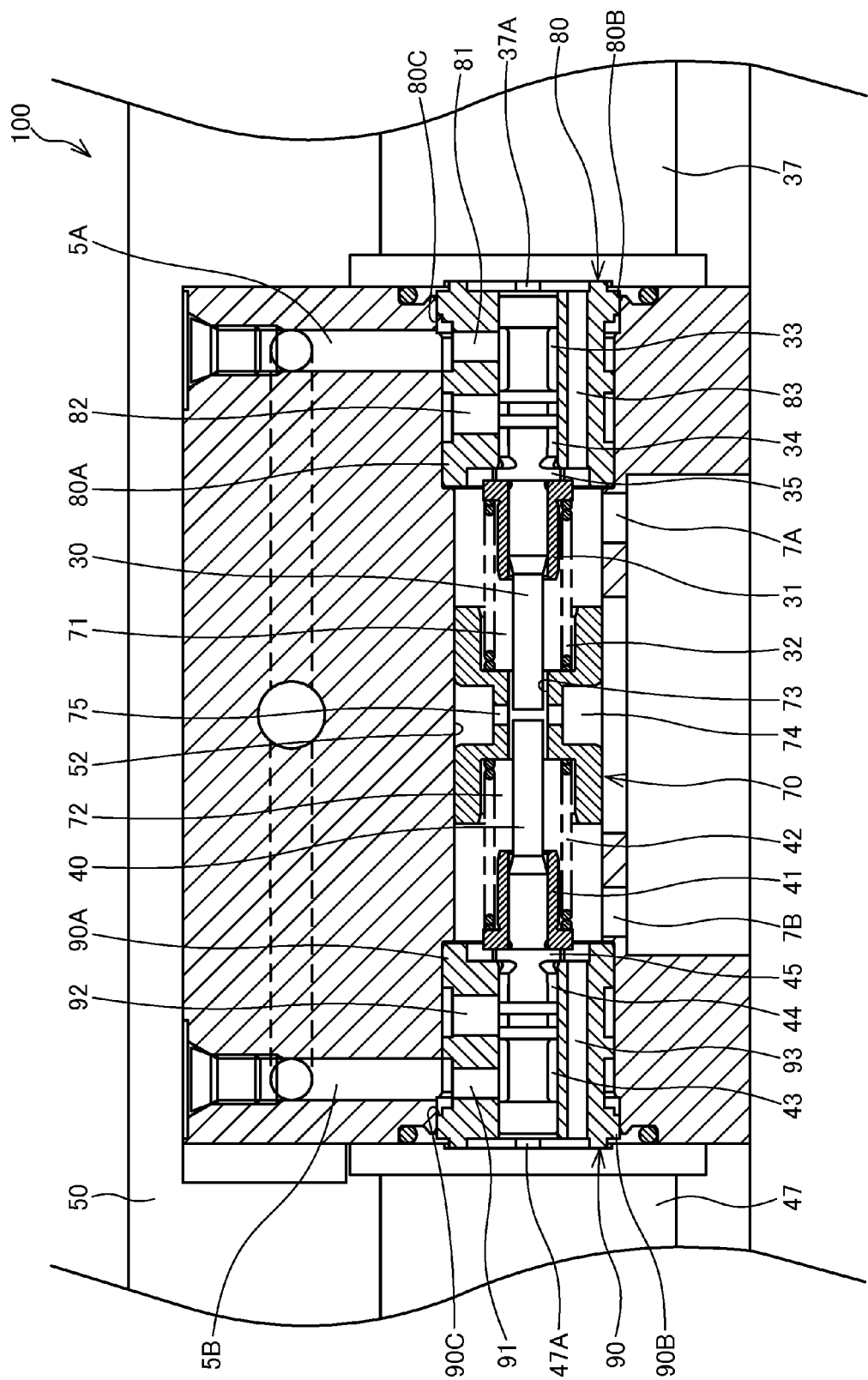
FIG. 3 is a partial sectional view of the servo regulator, taken along a III-III plane in FIG. 2.

As shown in FIGS. 2 and 3, the first spool valve 30 and the second spool valve 40 are disposed coaxially in the insertion hole 52. The first spool valve 30 is used to regulate the working oil pressure in the first pressure chamber 54, and the second spool valve 40 is used to regulate the working oil pressure in the second pressure chamber 55.

The cylindrical spring holder 70 is provided in a substantially central position of the insertion hole 52, and cylindrical first and second sleeves 80, 90 are provided in respective end positions of the insertion hole 52. The first spool valve 30 is held to be capable of moving in the axial direction via the spring holder 70 and the first sleeve 80, while the second spool valve 40 is held to be capable of moving in the axial direction via the spring holder 70 and the second sleeve 90.

A tip end part of the first spool valve 30 is inserted into the first sleeve 80 to be capable of sliding, and a tip end part of the second spool valve 40 is inserted into the second sleeve 90 to be capable of sliding. Respective rear end parts of the first spool valve 30 and the second spool valve 40 are housed in an insertion hole 73 in the spring holder 70.

A retainer 31 is fixed to an outer periphery of the first spool valve 30 in a central position in the axial direction so as to contact a projecting portion 35, and a retainer 41 is fixed to an outer periphery of the second spool valve 40 in a central position in the axial direction so as to contact a projecting portion 45. A spring 32 (a biasing member) is provided in a compressed condition between a spring bearing 71 formed on one end side of the spring holder 70 and the retainer 31, and a spring 42 (a biasing member) is provided in a compressed condition between a spring bearing 72 formed on another end side of the spring holder 70 and the retainer 41. The spring 32 biases the first spool valve 30 in a tip end direction, and the spring 42 biases the second spool valve 40 in the tip end direction.

The annular groove 74 is formed in an outer periphery of the spring holder 70 in a central position in the axial direction. The annular groove 74 is positioned between the spring bearing 71 and the spring bearing 72. The pin 14 (see FIG. 1) provided on the end portion of the arm 10 is inserted into the annular groove 74 in the spring holder 70. A through hole 75 connecting an interior and an exterior of the spring holder 70 is formed in a bottom portion of the annular groove 74.

As shown in FIGS. 1 and 2, the arm 10 and the spring holder 70 are coupled via the pin 14, and therefore, when the servo piston 20 moves such that the arm 10 rotates about the rotary shaft 11, the spring holder 70 moves in the axial direction via the pin 14. At this time, the spring holder 70 moves in an opposite direction to a movement direction of the servo piston 20.

As shown in FIGS. 2 and 3, the first sleeve 80 and the second sleeve 90 are provided in the respective end positions of the insertion hole 52.

The first sleeve 80 includes a supply port 81 that communicates with a hydraulic pump 5 (an oil pressure source) via a supply passage 5A, and a supply/discharge port 82 that communicates with the first pressure chamber 54 via a supply/discharge passage 6A. The second sleeve 90 includes a supply port 91 that communicates with the hydraulic pump 5 (the oil pressure source) via a supply passage 5B, and a supply/discharge port 92 that communicates with the second pressure chamber 55 via a supply/discharge passage 6B. Drain passages 7A, 7B are provided in the insertion hole 52 between the first sleeve 80 and the second sleeve 90 to return working oil in the insertion hole 52 to a tank 7.

The first spool valve 30 is provided to be capable of sliding relative to the first sleeve 80. Annular grooves 33, 34 are formed in an outer peripheral surface of the tip end part of the first spool valve 30. The annular groove 33 connects the supply port 81 to the supply/discharge port 82 in accordance with a position of the first spool valve 30, while the annular groove 34 connects the supply/discharge port 82 to the insertion hole 52 on the drain passage 7A side.

The second spool valve 40 is provided to be capable of sliding relative to the second sleeve 90. Annular grooves 43, 44 are formed in an outer peripheral surface of the tip end part of the second spool valve 40. The annular groove 43 connects the supply port 91 to the supply/discharge port 92 in accordance with a position of the second spool valve 40, while the annular groove 44 connects the supply/discharge port 92 to the insertion hole 52 on the drain passage 7B side.

The first spool valve 30 is driven by the first solenoid 37, and the second spool valve 40 is driven by the second solenoid 47. The first solenoid 37 and the second solenoid 47 are proportional solenoids in which a stroke of a plunger varies in proportion to an applied current value. The first solenoid 37 and the second solenoid 47 are attached to the case 50 so as to close the open ends of the insertion hole 52. The first solenoid 37 and the second solenoid 47 are respectively connected to a controller, not shown in the figures, via a wire 37B and a wire 47B.

The first spool valve 30 moves in the axial direction against the reaction force of the spring 32 when pressed by a plunger 37A of the first solenoid 37. The second spool valve 40 moves in the axial direction against the reaction force of the spring 42 when pressed by a plunger 47A of the second solenoid 47.

When the first solenoid 37 and the second solenoid 47 are in a non-driven condition, the first spool valve 30 and the second spool valve 40 are positioned in initial positions. At this time, the first spool valve 30 is stopped in a condition where the projecting portion 35 formed in a substantially central position of the spool valve contacts an inside end surface of the first sleeve 80, while an end surface of the first spool valve 30 and a tip end of the plunger 37A of the first solenoid 37 oppose each other via a predetermined gap (an initial gap). Further, the second spool valve 40 is stopped in a condition where the projecting portion 45 formed in a substantially central position of the spool valve contacts an inside end surface of the second sleeve 90, while an end surface of the second spool valve 40 and a tip end of the plunger 47A of the second solenoid 47 oppose each other via a predetermined gap (an initial gap).

Next, referring to FIGS. 1 to 4B, an operation of the servo regulator 100 will be described.

Figure 4A:
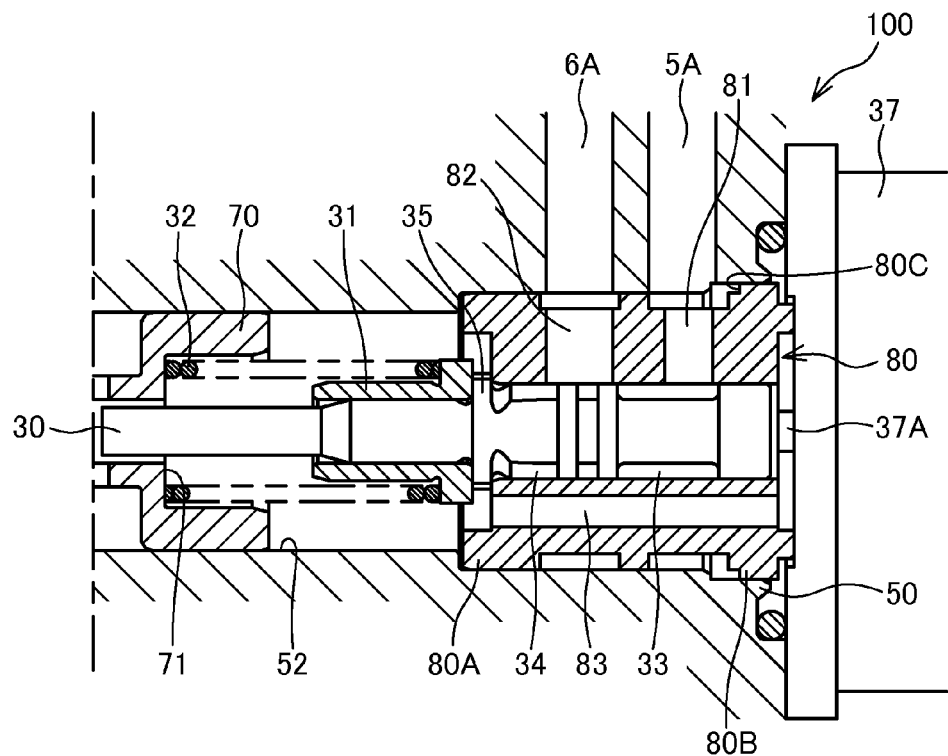
FIG. 4A is a partially enlarged view of the servo regulator when a solenoid is in a non-driven condition.

When a driver operates a control lever of the vehicle in order to cause the vehicle to advance, a current corresponding to an operation amount of the control lever is applied to the first solenoid 37, whereby the plunger 37A of the first solenoid 37 drives the first spool valve 30 in the initial position, shown in FIG. 4A.

Figure 4B:
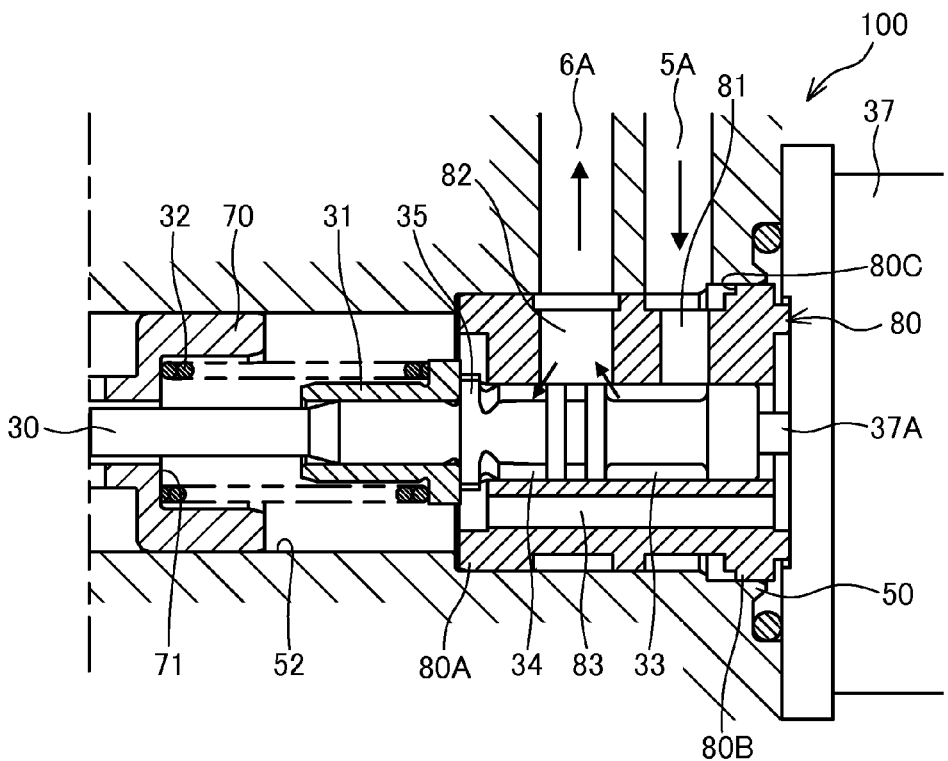
FIG. 4B is a partially enlarged view of the servo regulator when the solenoid is in a driven condition.

As shown in FIG. 4B, when the first spool valve 30 is driven by the plunger 37A to move in a leftward direction of the figure, the annular groove 33 of the first spool valve 30 connects the supply port 81 to the supply/discharge port 82, and the annular groove 34 connects the supply/discharge port 82 to the insertion hole 52 on the drain passage 7A side. As a result, working oil discharged from the hydraulic pump 5 flows into the first pressure chamber 54 through the supply/discharge port 82 and the supply/discharge passage 6A. A part of the working oil discharged from the hydraulic pump 5 is discharged into the tank 7 via the annular groove 34 and the drain passage 7A. By distributing the working oil discharged from the hydraulic pump 5 between the first pressure chamber 54 side and the drain passage 7A side in this manner, the working oil pressure is reduced, and as a result, a predetermined pilot pressure is led into the first pressure chamber 54.

At this time, the second solenoid 47 is in the non-driven condition, and therefore the second spool valve 40 is stopped in the initial position, as shown in FIGS. 2 and 3. In this condition, the second spool valve 40 closes the supply port 91 such that the second pressure chamber 55 communicates with the drain passage 7B via the supply/discharge passage 6B, the supply/discharge port 92, and the annular groove 44. As a result, a tank pressure is led into the second pressure chamber 55.

When the pilot pressure is led into the first pressure chamber 54 and the tank pressure is led into the second pressure chamber 55 in this manner, the servo piston 20 moves in the leftward direction of the figure from the neutral position shown in FIG. 2 against a biasing force of the springs 59A, 59B. When the servo piston 20 moves in the leftward direction from the neutral position, the slide metal 13 (see FIG. 1) displaces in the leftward direction together with the servo piston 20, whereby the arm 10 rotates leftward. Accordingly, the swash plate 3 of the piston pump 1 tilts to one side such that the travel hydraulic motor rotates normally, and as a result, the vehicle advances.

When the arm 10 rotates leftward, the spring holder 70 moves in a rightward direction of FIG. 4B via the pin 14 of the arm 10, and as a result, the spring 32 between the spring holder 70 and the retainer 31 is compressed, leading to an increase in the spring reaction force attempting to return the first spool valve 30 to the initial position. When the reaction force of the spring 32 and a thrust of the plunger 37A of the first solenoid 37 are counterbalanced, the first spool valve 30 stops in a predetermined position, whereby the working oil pressure in the first pressure chamber 54 is held at a fixed value. Accordingly, the servo piston 20 also stops in a predetermined position, whereby the tilt angle of the swash plate 3 of the piston pump 1 is maintained at a predetermined angle.

When the driver operates the control lever to cause the vehicle to reverse, on the other hand, a current corresponding to the operation amount of the control lever is applied to the second solenoid 47, whereby the plunger 47A of the second solenoid 47 drives the second spool valve 40 in the initial position (see FIGS. 2 and 3).

In FIGS. 2 and 3, when the second spool valve 40 is driven by the plunger 47A to move in the rightward direction, the annular groove 43 of the second spool valve 40 connects the supply port 91 to the supply/discharge port 92, and the annular groove 44 connects the supply/discharge port 92 to the insertion hole 52 on the drain passage 7B side. As a result, the working oil discharged from the hydraulic pump 5 flows into the second pressure chamber 55 through the supply/discharge port 92 and the supply/discharge passage 6B. A part of the working oil discharged from the hydraulic pump 5 is discharged into the tank 7 via the annular groove 44 and the drain passage 7B. By distributing the working oil discharged from the hydraulic pump 5 between the second pressure chamber 55 side and the drain passage 7B side in this manner, the working oil pressure is reduced, and as a result, a predetermined pilot pressure is led into the second pressure chamber 55.

At this time, the first solenoid 37 is in the non-driven condition, and therefore the first spool valve 30 is stopped in the initial position. In this condition, the first spool valve 30 closes the supply port 81 such that the first pressure chamber 54 communicates with the drain passage 7A via the supply/discharge passage 6A, the supply/discharge port 82, and the annular groove 34. As a result, the tank pressure is led into the first pressure chamber 54.

When the pilot pressure is led into the second pressure chamber 55 and the tank pressure is led into the first pressure chamber 54 in this manner, the servo piston 20 moves in the rightward direction of the figure from the neutral position shown in FIG. 2 against the biasing force of the springs 59A, 59B. When the servo piston 20 moves in the rightward direction from the neutral position, the slide metal 13 (see FIG. 1) displaces in the rightward direction together with the servo piston 20, whereby the arm 10 rotates rightward. Accordingly, the swash plate 3 of the piston pump 1 tilts to the other side such that the travel hydraulic motor rotates in reverse, and as a result, the vehicle reverses.

When the arm 10 rotates rightward, the spring holder 70 moves in a leftward direction of FIG. 3 via the pin 14 of the arm 10, and as a result, the spring 42 between the spring holder 70 and the retainer 41 is compressed, leading to an increase in the spring reaction force attempting to return the second spool valve 40 to the initial position. When the reaction force of the spring 42 and a thrust of the plunger 47A of the second solenoid 47 are counterbalanced, the second spool valve 40 stops in a predetermined position, whereby the working oil pressure in the second pressure chamber 55 is held at a fixed value. Accordingly, the servo piston 20 also stops in a predetermined position, whereby the tilt angle of the swash plate 3 of the piston pump 1 is maintained at a predetermined angle.

According to the servo regulator 100, the tilt angle of the swash plate 3 of the piston pump 1 can be controlled by driving the first and second spool valves 30, 40 using the first and second solenoids 37, 47 in order to adjust the working oil pressure in the first and second pressure chambers 54, 55 such that the position of the servo piston 20 is modified.

In the servo regulator 100 described above, the gap (the initial gap) between the end surfaces of the first and second spool valves 30, 40 in the initial position and the tip ends of the plungers 37A, 47A of the first and second solenoids 37, 47 in the non-driven condition is preferably constant. In a servo regulator 200 serving as a reference example, shown in FIG. 7, the initial gap varies to a certain extent due to dimension errors and the like in the various constituent members, but with the servo regulator 100 according to this embodiment, variation in the initial gap can be reduced.

Variation in the initial gap on the first spool valve 30 side will be described below while comparing the servo regulator 100 according to this embodiment and the servo regulator 200 serving as the reference example. It should be noted that in the servo regulator 200 shown in FIG. 7, members having identical functions to their counterparts in the servo regulator 100 according to this embodiment have been allocated identical reference symbols.

Figure 7:
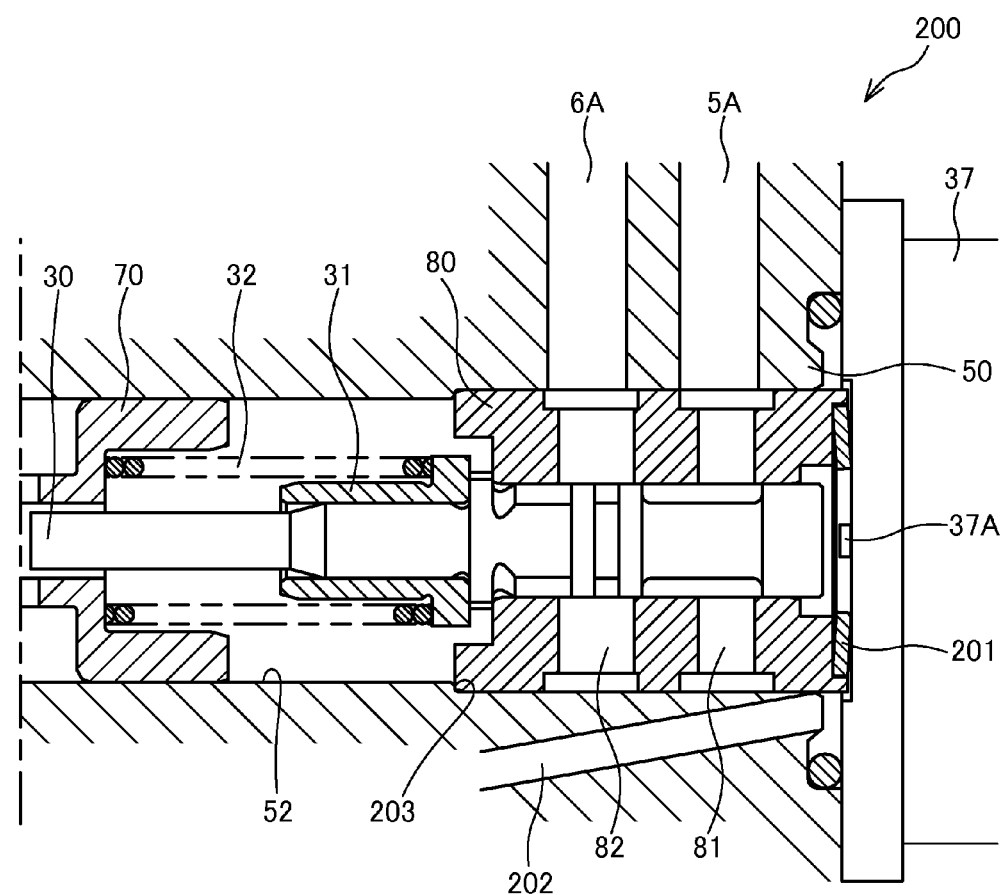
FIG. 7 is a partially enlarged view of a servo regulator serving as a reference example.

As shown in FIG. 7, in the servo regulator 200 serving as the reference example, the first sleeve 80 is provided in the insertion hole 52 such that an outer edge part of an inside end surface thereof contacts a contact portion 203 formed on the inner peripheral surface of the insertion hole 52. The outer edge part of the inside end surface of the first sleeve 80 is pressed against the contact portion 203 via a spring washer 201 disposed between the first sleeve 80 and the first solenoid 37. In the servo regulator 200 thus configured, errors occur not only in the dimensions of the first sleeve 80, but also in a formation position of the contact portion 203 within the insertion hole 52 and so on, and therefore variation in the gap between the end surface of the first spool 30 in the initial position and the tip end of the plunger 37A in the non-driven condition increases.

It should be noted that in the servo regulator 200, working oil leaking out between the first sleeve 80 and the first solenoid 37 through a gap between the first sleeve 80 and the first spool valve 30 is returned to a tank (not shown) via a discharge passage 202 formed in the case 50.

In the servo regulator 100 according to this embodiment, on the other hand, as shown in FIG. 4A, the first sleeve 80 is configured such that an outside end surface thereof contacts the end surface of the first solenoid 37.

The first sleeve 80 is formed such that an outer periphery thereof is larger on the solenoid side of the supply port 81 than in other parts. In other words, an outside end of the first sleeve 80 constitutes a large diameter portion 80B, and a remaining part of the first sleeve 80 constitutes a small diameter portion 80A. A step surface formed on a boundary between the small diameter portion 80A and the large diameter portion 80B serves as a pressure receiving portion 80C.

The supply port 81 is formed such that the working oil discharged from the hydraulic pump 5 reaches the pressure receiving surface 80C. The oil pressure of the working oil discharged from the hydraulic pump 5 therefore acts on the pressure receiving portion 80C of the first sleeve 80 via the supply port 81. When the oil pressure of the working oil acts on on the pressure receiving portion 80C, a biasing force for biasing the first sleeve 80 to the first solenoid 37 side is generated, and the outside end surface of the first sleeve 80 is pressed against the end surface of the first solenoid 37 by this biasing force.

In the servo regulator 100 thus configured, the variation caused by the contact portion 203 (see FIG. 7) of the insertion hole 52 according to the reference example does not occur, and therefore variation in the gap between the end surface of the first spool valve 30 in the initial position and the tip end of the plunger 37A in the non-driven condition can be reduced.

A rectilinear discharge passage 83 is formed in the first sleeve 80 to connect a space between the first sleeve 80 and the first solenoid 37 to the insertion hole 52 on the inner side of the first sleeve 80. Working oil leaking out between the first sleeve 80 and the first solenoid 37 through a gap between the first sleeve 80 and the first spool valve 30 is discharged into the tank 7 via the discharge passage 83 and the drain passage 7A.

Figure 5:
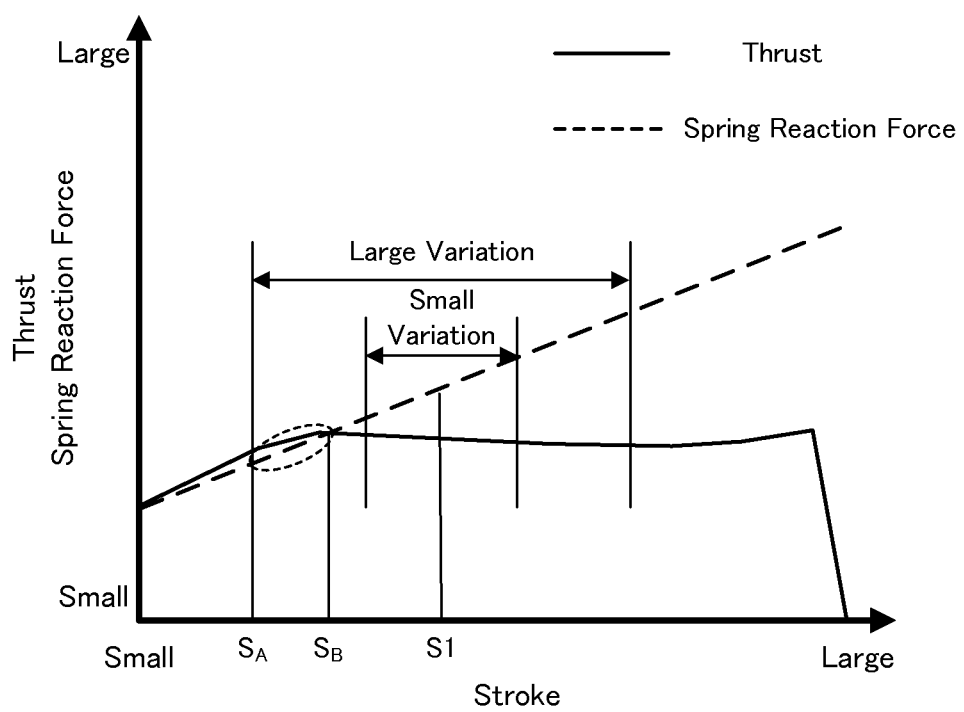
FIG. 5 is a view showing relationships between a stroke and a thrust of a plunger of the solenoid, and between the stroke of the plunger and a spring reaction force.

FIG. 5 is a view showing a relationship between the stroke and the thrust of the plunger 37A and a relationship between the stroke of the plunger 37A and the reaction force of the spring 32 in a case where the first solenoid 37 is driven at a minimum current value.

Here, a reference value of the gap (the initial gap) between the end surface of the first spool valve 30 in the initial position and the tip end of the plunger 37A in the non-driven condition is set at S1. In this case, when the stroke of the plunger 37A reaches S1, the tip end of the plunger 37A contacts the first spool valve 30. The reference value S1 of the initial gap is set at a value at which thrust variation relative to stroke variation is comparatively small and the thrust of the plunger 37A is smaller than the reaction force of the spring 32 at an identical stroke. Hence, in a condition where the minimum current value is applied to the first solenoid 37, the first spool valve 30 is not driven.

When the initial gap narrows, for example, in a case where variation in the initial gap is large, as in the servo regulator 200, the plunger 37A contacts the first spool valve 30 at a stroke $S_A$. As shown by a dotted line region in FIG. 5, when the plunger 37A contacts the first spool valve 30 at the stroke $S_A$, at which the reaction force of the spring 32 is smaller than the thrust of the plunger 37A, the plunger 37A and the first spool valve 30 move (jump) to a stroke $S_B$ at which the thrust of the plunger 37A and the reaction force of the spring 32 are counterbalanced. Hence, in the servo regulator 200 having increased variation in the initial gap, an initial operation of the first spool valve 30 is unstable.

In the servo regulator 100 according to this embodiment, on the other hand, variation in the initial gap can be reduced by causing the first sleeve 80 to contact the first solenoid 37. In so doing, even when variation occurs in the initial gap, the initial gap can be set at a value at which thrust variation relative to stroke variation is comparatively small, and the thrust of the plunger 37A is smaller than the reaction force of the spring 32 at an identical stroke. As a result, the first spool valve 30 can be prevented from jumping.

As shown in FIG. 3, the second sleeve 90 along which the second spool valve 40 slides is configured similarly to the first sleeve 80 so as to include a pressure receiving portion 90C (a step surface) formed on a boundary between a small diameter portion 90A and a large diameter portion 90B, and a discharge passage 93 for discharging the working fluid that leaks out between the second sleeve 90 and the second solenoid 47. The second sleeve 90 is likewise configured such that when the oil pressure of the working oil discharged from the hydraulic pump 5 is exerted on the pressure receiving portion 90C, an outside end surface thereof is pressed against the end surface of the second solenoid 47.

With the servo regulator 100 according to this embodiment, following effects can be obtained.

In the servo regulator 100, the first sleeve 80 is pressed against the end surface of the first solenoid 37 by exerting the oil pressure of the working oil discharged from the hydraulic pump 5 on the pressure receiving portion 80C, and the second sleeve 90 is pressed against the end surface of the second solenoid 47 by exerting the oil pressure of the working oil discharged from the hydraulic pump 5 on the pressure receiving portion 90C. Hence, the problematic variation caused by the contact portion 203 of the servo regulator 200 shown in FIG. 7 does not occur, and therefore variation in the gaps between the end surfaces of the first and second spool valves 30, 40 in their initial positions and the tip ends of the plungers 37A, 47A of the first and second solenoids 37, 47 in the non-driven condition can be reduced.

Accordingly, the first and second spool valves 30, 40 can be prevented from jumping and so on, and as a result, a reduction in the controllability of the first and second spool valves 30, 40 can be suppressed. Further, the first and second sleeves 80, 90 are caused to contact the first and second solenoids 37, 47 using the oil pressure of the working oil, and therefore the configuration of the servo regulator 100 can be simplified in comparison with the servo regulator 200 requiring the spring washer 201. As a result, a reduction in cost can be achieved.

In the servo regulator 100, the first and second sleeves 80, 90 respectively include the discharge passages 83, 93 for discharging the working oil that leaks out between the sleeves and the solenoids. When the discharge passage 202 shown in FIG. 7 is provided in the case 50 of the servo regulator 100, the supply ports 81, 91 communicate with the discharge passage 202 in the vicinity of the pressure receiving portions 80C, 90C such that a part of the working oil in the supply ports 81, 91 leaks out, and therefore, in the servo regulator 100, the discharge passages 83, 93 are provided in the first and second sleeves 80, 90. Further, in contrast to the servo regulator 200, in which the discharge passage 202 is provided in the case 50, laborious processing does not have to be implemented on the case 50 of the servo regulator 100. Since the discharge passages 83, 93 of the first and second sleeves 80, 90 are rectilinear, a passage forming process can be performed easily.

Figure 6:
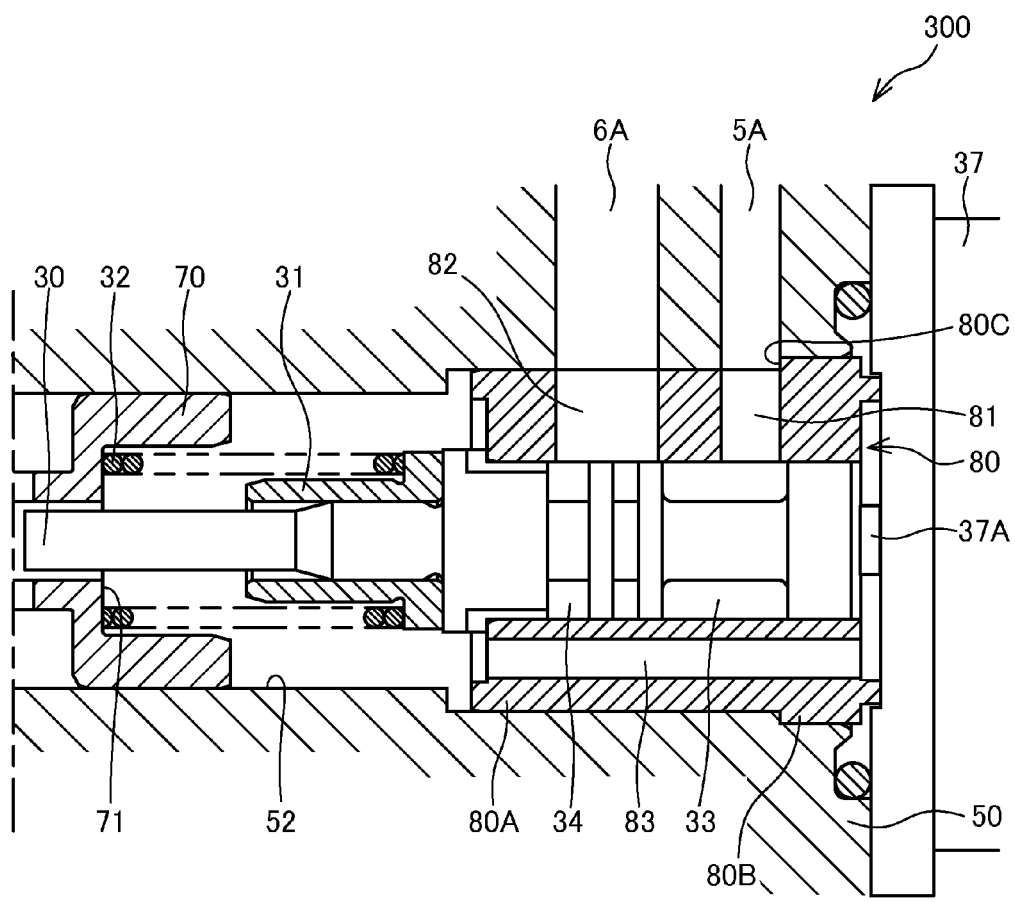
FIG. 6 is a partially enlarged view of a servo regulator according to a modified example of this embodiment of the present invention.

Finally, referring to FIG. 6, a servo regulator 300 according to a modified example of this embodiment will be described.

In the servo regulator 100 according to this embodiment, the pressure receiving portion 80C of the first sleeve 80 faces the supply passage 5A via the supply port 81. In the servo regulator 300 according to the modified example, on the other hand, the supply port 81 is not interposed, and therefore the pressure receiving portion 80C of the first sleeve 80 faces the supply passage 5A directly. Likewise with this configuration, the oil pressure of the working oil discharged from the hydraulic pump 5 is exerted on the pressure receiving portion 80C, and therefore the first sleeve 80 is disposed in the insertion hole 52 such that the end surface of the first sleeve 80 contacts the end surface of the first solenoid 37.

It should be noted that the second sleeve 90 of the servo regulator 300 is configured similarly to the first sleeve 80.

Embodiments of this invention were described above, but the above embodiments are merely examples of application of this invention. The technical scope of this invention is not limited to the specific constitutions of the above embodiments.

In the servo regulators 100, 300 according to this embodiment, working oil is used as a working fluid, but an alternative aqueous solution, a gas, or the like may be used instead of working oil.

This application claims priority based on Japanese Patent Application No. 2012-76967, filed with the Japan Patent Office on Mar. 29, 2012, the entire contents of which are incorporated into this specification by reference.

The invention claimed is:

1. A servo regulator including a servo piston disposed in a case to be free to slide, and pressure chambers provided to face respective ends of the servo piston, wherein the servo piston is moved in an axial direction by controlling a working fluid pressure in the pressure chambers, the servo regulator comprising:
   a sleeve that is inserted into an insertion hole formed in the case and has a port capable of supplying a working fluid from a fluid pressure source to one of the pressure chambers;
   a spool valve disposed in the sleeve and biased by a biasing member to be capable of opening and closing the port; and
   a solenoid that is attached to the case so as to close the insertion hole, and drives the spool valve against a biasing force of the biasing member via a plunger,
   wherein the sleeve includes a pressure receiving portion on which a fluid pressure of the working fluid from the fluid pressure source is exerted, and is configured to be pressed against an end surface of the solenoid by a biasing force acting on the pressure receiving portion.

2. The servo regulator as defined in claim 1, wherein the sleeve is a cylindrical member constituted by a large diameter portion provided on a solenoid side end and a small diameter portion constituting a remaining part, and
   the pressure receiving portion is a step surface formed on a boundary between the small diameter portion and the large diameter portion.

3. The servo regulator as defined in claim 1, wherein the sleeve comprises a discharge passage for discharging working fluid that leaks out between an end surface of the spool valve and the end surface of the solenoid.

\* \* \* \* \*